United States Patent
Koon et al.

[11] Patent Number: 5,873,973
[45] Date of Patent: Feb. 23, 1999

[54] METHOD FOR SINGLE FILAMENT TRANSVERSE REINFORCEMENT IN COMPOSITE PREPREG MATERIAL

[75] Inventors: Robert W. Koon, Palos Verdes; Thomas E. Steelman, Torrance, both of Calif.

[73] Assignee: Northrop Grumman Corporation, Los Angeles, Calif.

[21] Appl. No.: 422,210

[22] Filed: Apr. 13, 1995

[51] Int. Cl.⁶ .............................. H01L 41/08; B32B 5/12; B32B 31/00
[52] U.S. Cl. ..................... 156/272.4; 156/62.2; 156/160; 427/462
[58] Field of Search .................................. 156/62.2, 160, 156/272.4; 427/462

[56] References Cited

U.S. PATENT DOCUMENTS

| | | | |
|---|---|---|---|
| 4,328,272 | 5/1982 | Maistre | 428/119 |
| 4,613,784 | 9/1986 | Haun et al. | 310/358 |

*Primary Examiner*—Richard Weisberger
*Attorney, Agent, or Firm*—Terry J. Anderson; Karl J. Hoch, Jr.

[57] ABSTRACT

A method and apparatus for producing a reinforced composite prepreg material comprising the steps of aligning discontinuous fibers by use of a strong electric field while simultaneously inserting the fibers through a mesh screen and into a ply or plies of fiber reinforced polymer matrix composite in an uncured state in a direction normal to the surface of the composite material. After the fibers are attached in the ply of fiber reinforced polymer matrix composite, the aligned fibers are forced through the composite material by applying a gentle pressure to the top of the conductive fibers while simultaneously being guided by the mesh screen. After the insertion process has been completed, the mesh screen is lifted vertically away from the composite material and any unaligned fibers are simultaneously removed. The newly formed reinforced prepreg composite films are then stacked on top of each other and pressurized and cured in an autoclave or press to produce an improved composite laminate.

16 Claims, 4 Drawing Sheets

| Fiber | Thermal Conductivity (W/m-K) |
|---|---|
| (Epoxy) | 0.2 |
| AS4 | 1.0 |
| K1100 | 1.5 - 4 |
| P120 | 1.5 - 7.5 |
| P120 (Mat) | 12.0 |
| K1100 (Mat) | 17.3 |

FIG. 9

| Fiber | Resistance ($\Omega$) |
|---|---|
| Silicone | ~$10^9$ |
| Silicone + Random Carbon Fiber | ~$10^6$ |
| Silicone + Cu Particulate | ~$10^3$ |
| Silicone + Flocked Carbon Fiber | ~$10^0$ |
| Silicone + Cu Particulate + Flocked Carbon Fiber | ~$10^{-1}$ |

FIG. 10

METHOD FOR SINGLE FILAMENT TRANSVERSE REINFORCEMENT IN COMPOSITE PREPREG MATERIAL

BACKGROUND OF THE INVENTION

1. Field of the Invention

The present invention relates to an improved method and apparatus for producing a reinforced composite prepreg material. More particularly, the invention relates to a method and apparatus of manufacturing a reinforced polymer matrix composite material by utilizing discontinuous fibers which are embedded in the composite material in the Z-direction.

2. Discussion of the Prior Art

There are currently a number of commercial and defense manufacturing companies that are laminating composite prepreg plies (sheets of uncured resin impregnated onto either continuous or discontinuous reinforcement fibers) to form composite prepreg materials for the manufacturing of composite structures in the aerospace and automotive industry. These types of continuous or alternatively discontinuous composite prepreg materials are typically composed of approximately forty percent cured resin matrix to sixty percent fiber material with the fibers being oriented in the x-y plane or in-plane of the resin matrix.

It is known that these types of composite prepreg materials formed by current manufacturing techniques have a defect in common, namely, weakness in transverse tensile strength and interlaminar shear and peel strength due to the lack of reinforcement fibers in a direction perpendicular to the plane of the fibers. In order to overcome this disadvantage, prior art manufacturing processes have been developed for implanting transversely oriented fibers in the composites. However, the prior art implantation process results in breakage to the in-plane fibers and subsequently reduces in-plane strength. This reduction in in-plane strength limits the transverse fiber volume using the prior art process to two percent.

Other prior art improves transverse strength in polymer composite materials by utilizing three dimensional fiber weaves which are subsequently impregnated with resin using manufacturing processes such as resin transfer molding. These 3D weaves are costly and do not offer the manufacturing flexibility of composite prepreg.

Therefore, a need exists to provide a low cost method to reinforce composite prepreg materials by implanting transversely oriented single fiber filaments without breaking the in-plane fibers and simultaneously achieving high transverse fiber volumes thereby improving the interlaminar strength and damage tolerance of composite prepreg materials.

The subject invention herein solves all of these problems in a new and unique manner which has not been part of the art previously. Some related patents are described below:
U.S. Pat. No. 4,613,784 issued to M. Haun et al., on Sep. 23, 1986.

This patent describes a piezoelectric PZT-polymer composite of 1-3 and 1-3-0 connectivity which is transversely reinforced with glass fibers to increase the hydrostatic piezoelectric charge and voltage coefficients for possible use in hydrophone applications.

U.S. Pat No. 4,328,272 issued to M. Maistre on May 4, 1982

This patent is directed to a structure comprising a stack of superimposed layers of bi-dimensional reinforcing material and rectilinear elements located transversely through the stack with each reinforcing element being at an angle with the plane that is tangential to the layers it transverses.

While the basic concepts presented in the aforesaid patents are desirable, the methods employed by each for Z-direction reinforcement are limited by the materials used to achieve the desired result and furthermore do not provide for simultaneously enhancing the structural, thermal and electrical conductivity of the material.

SUMMARY OF THE INVENTION

The present invention is directed to a method for inserting conductive or non-conductive fibers through the thickness of single or multiple plies of fiber reinforced polymer matrix composite or composite prepreg material by use of a processing apparatus in association with an alignment apparatus. The alignment apparatus further includes the ability to implant a single fiber filament without breaking in-plane fibers.

The method comprises the steps of aligning the discontinuous fibers by use of a strong electric field while simultaneously inserting the fibers through aligning apertures and into a ply of uncured fiber reinforced polymer matrix composite in a direction normal to the surface of the composite material. The processing apparatus is a fixture for receiving a batch of fibers wherein the fibers are aligned and inserted into an uncured fiber reinforced polymer matrix composite by use of an electric field.

The process of aligning and transporting the fibers in an electric field is referred to as "flocking" and is a well-established textile technology. The ability to work with conductive fibers requires modification to typical "flocking" apparatus. These modification have, for instance, been performed by Energy Science Laboratories, Inc., in San Diego, Calif. The basic flocking process for conductive or non-conductive fibers is not a subject of this invention. However, flocking technology must be utilized and augmented such that it may be applied to reinforcing polymer composites as described. This revised flocking method and the subsequent process steps are the subject of this invention.

The alignment process comprises a mesh screen or the like, located parallel and substantially adjacent to the ply of uncured fiber reinforced polymer matrix composite and defines a plurality of alignment apertures having sidewalls sized to allow the discontinuous fibers to pass through the mesh screen and into the composite material. The width and location of the mesh screen and length of the discontinuous fibers are such that upon insertion of the discontinuous fibers into the reinforced composite material, the fibers are located within and protrude out from the alignment apertures of the mesh screen.

After the fibers are embedded in the ply of fiber reinforced polymer matrix composite, the aligned fibers are forced through the composite material by applying a gentle pressure to the top of the conductive fibers. By use of the mesh screen's alignment apertures, the fibers are guided through the composite material transversely with respect to the in-plane fibers. After the insertion process has been completed, the mesh screen is lifted vertically away from the composite material and any unaligned fibers are simultaneously removed.

These newly formed Z-directed fiber reinforced polymer matrix composite plies or films are then stacked upon each other, placed in an autoclave, pressurized and cured to produce an improved composite molding compound which can be either machined or inserted within a molding die, compressed and hardened to form a high strength shaped member.

Accordingly, it is an object of the present invention to provide a method of reinforcing polymer matrix composites or prepreg composites which improves the tailorable Z-direction thermal and electrical conductivity.

A further object of the present invention is to provide an improved fiber reinforced polymer matrix composite having enhanced damage tolerance without a reduction of in-plane properties.

Still another object of the present invention is to provide a fiber reinforced polymer matrix composite having improved transverse tensile and inter-laminar shear and peel strengths.

Still, yet another object of the present invention is to provide a method for manufacturing polymer matrix composites having highly aligned Z-direction fiber volumes of 10–15%.

It is a further object of the present invention to provide a process for aligning and inserting discontinuous fibers into a fiber reinforced polymer matrix composite in a direction normal to the surface of the substrate.

Accordingly, it is an object of the present invention to provide a method of using conductive or non-conductive fibers that achieve the electrical conductivity or reflectivity desired while simultaneously improving thermal and mechanical strength. The improvements afforded by this method and apparatus will be set throughout the following description, claims and accompanying drawings.

BRIEF DESCRIPTION OF THE DRAWINGS

The above as well as other advantages of the present invention will become readily apparent to those skilled in the art from the following description of the preferred embodiments when considered in the light of the accompanying drawings in which:

FIG. 9 is a graph illustrating the improvement in thermal conductivity by use of the method of the present invention; and FIG. 10 is a graph illustrating the improvement in electrical conductivity by use of the method of the present invention.

DESCRIPTION OF THE PREFERRED EMBODIMENTS

Figure 1:
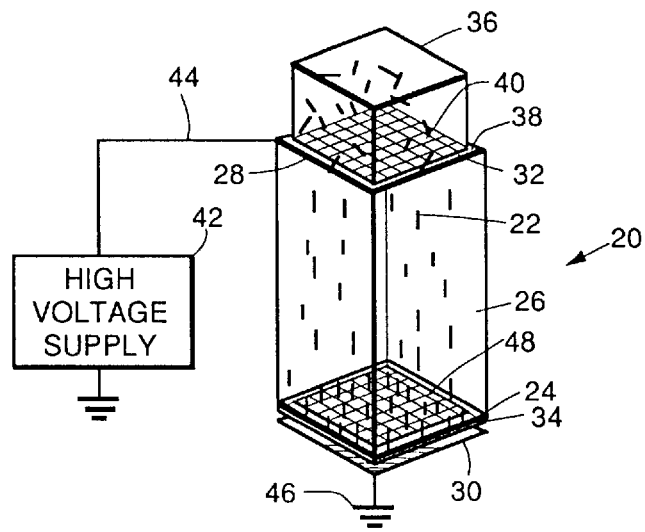
FIG. 1 is a diagrammatic view of the apparatus for using electric fields to align and attach discontinuous fibers into a single ply of uncured fiber reinforced polymer matrix composite.

Referring now to the drawings, wherein like reference numerals refer to like and corresponding parts throughout, in FIG. 1, there is illustrated an electric alignment apparatus 20 utilizing electric fields to align and attach discontinuous fibers 22 to the surface of a single ply of fiber reinforced polymer matrix composite or composite prepreg material 24. The alignment apparatus 20 includes an elongated rectangular alignment tank 26 made of a nonconductive material with positive and negative plate electrodes 28 and 30, which are shown substantially parallel and facing each other located along a top panel 32 and underneath a bottom panel 34 of the alignment tank 26, respectively. The alignment tank 26 also contains at the top panel 32 a fiber bin 36 surrounding the positive plate electrode 28 for placement of the discontinuous fibers 22 which are to be attached to the fiber reinforced polymer matrix composite 24 as will be more fully described below.

As shown in FIG. 1, and described above, positioned underneath the bottom panel 34 of alignment tank 26 is the negative plate electrode 30 which is located substantially parallel and adjacent to the bottom panel 34. The positive plate electrode 28 located at the top panel 32 of alignment tank 26, comprises a mesh grid 38 defining a plurality of grid apertures 40 sufficiently large to allow passage of the discontinuous fibers 22 to fall through the apertures 40. The discontinuous fibers 22 are placed in the fiber bin 36 during the alignment portion of the process, as will be more fully explained below. A source of high voltage 42 as is generally used during the normal flocking process is connected through wires 44 and 46 to the positive and negative plate electrodes 28 and 30, respectively.

The positive plate electrode 28 and negative plate electrode 30 are spaced apart a distance such that the field lines will be substantially parallel throughout the alignment tank 26, and sufficiently far apart to prevent the high voltage 42 from arcing across the positive and negative plate electrodes 28 and 30, respectively. Those skilled in the art will recognize that many variations of locations of the plate electrodes 28 and 30 are possible within the scope of the present invention, including use of various conducting and insulating materials for both the alignment tank 26 and positive and negative plate electrodes 28 and 30, respectively.

Referring now to FIG. 1, a single ply of fiber reinforced polymer matrix composite 24 is placed onto the top of bottom panel 34 of alignment tank 26 and located underneath a mesh screen 48 which is fixedly held parallel and substantially adjacent to the single ply of fiber reinforced polymer matrix composite 24. The single ply of fiber reinforced polymer matrix composite 24 is either preheated before placement or may be heated by the bottom panel 34 of alignment tank 26 to a temperature sufficient to make the resin matrix portion 54 of the composite material 24 reach a tacky state necessary to adhere the flock fibers to it.

When the single ply of fiber reinforced polymer matrix composite 24 is in the uncured state, the high voltage source 42 is turned on and a plurality of discontinuous fibers 22 are then poured into or delivered to the fiber bin 36. The discontinuous fibers 22 fall through the grid apertures 40 of the positive plate electrode 28 and into the alignment tank 30, where they are subjected to an electric field (not shown) induced by the high voltage 42 applied to the positive and negative plate electrodes 28 and 30, respectively. In the preferred embodiment, the voltage applied to the positive and negative plate electrodes 28 and 30 respectively, is a direct current which is typically 50 kv or higher.

In the preferred embodiment, conductive carbon fibers 22 are used in the alignment process according to the present invention. Carbon fibers 22 are preferred because of their characteristic high electrical conductivity and suitability for the alignment method of the present invention. By way of example, but not of limitation, the invention will also work with substitute fibers, as example, synthetic and natural fibers, as well as metal filaments or the like, as long as such fibers have electrical characteristics which allow them to be aligned in accordance with the lines of flux generated by the high voltage electric field generated between the positive and negative plate electrodes 28 and 30, respectively.

The conductive nature of the discontinuous carbon fibers 22 causes them to behave as small electric dipoles in the presence of an electric field, wherein they align with the electric lines of flux induced within the alignment tank 26. As shown in FIG. 1, the relationship between the positive and negative plate electrodes 28 and 30 cause the discontinuous carbon fibers 22 to fall through the alignment tank 26 in a substantially vertically oriented direction. The tacky resin matrix portion 54 of the composite material 24 effectively receives and adhesively captures and holds the alignment of the discontinuous carbon fibers 22 in an upright position upon insertion into the plies of fiber reinforced polymer matrix composite 24 when the discontinuous carbon fibers 22 reach the bottom panel 34 of alignment tank 26.

Figure 2:
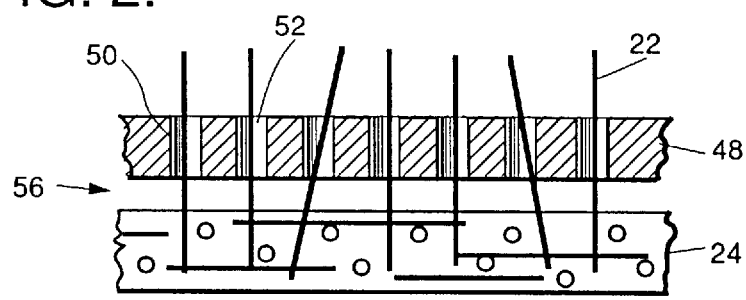
FIG. 2 is a cross-section of a screen mesh or the like used to align fibers located adjacent to a single ply of fiber reinforced polymer matrix composite of the present invention.

Referring now to FIG. 2, the mesh screen 48 which is located parallel and substantially adjacent to the single ply of fiber reinforced polymer matrix composite 24, defines a plurality of alignment apertures 50 having sidewalls or cross section of a thickness 52 sized to allow the discontinuous fibers 22 to pass through the apertures 50 into the single ply of fiber reinforced polymer matrix composite 24. The width and location of the mesh screen 48 and length of the discontinuous fibers 22 are such that upon insertion of the discontinuous fibers 22 into the uncured resin matrix portion 54 of the composite material 24, the discontinuous carbon fibers 22 are located within and protrude out from the alignment apertures 50 of the mesh screen 48. Typically, the apertures are on the order of 2 to 5 times the diameter of the impinging fibers.

Figure 3:
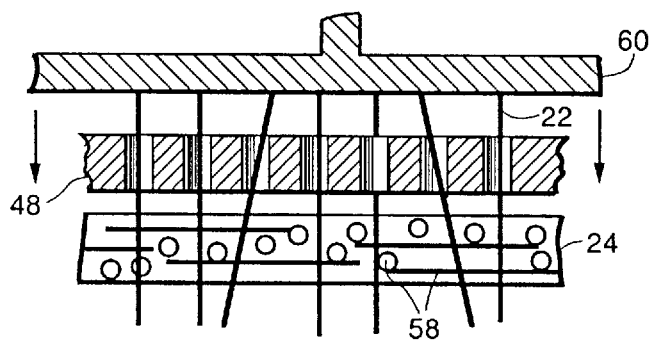
FIG. 3 shows the configuration of FIG. 2 in use to illustrate the insertion process of the present invention.

After the fiber flocking process has been completed, the high voltage source 42 is turned off and the plies of fiber reinforced polymer matrix composite 24 and mesh screen 48 are removed together from the alignment tank 26. As shown in FIG. 3, the aligned discontinuous fibers 22 are forced through the composite material 24 by applying a gentle pressure to the top of the discontinuous fibers 22. The pressure may be applied by a high precision press 60 or by any other means known in the art for controlling a compressive force. By use of the mesh screen 48, the discontinuous fibers 22 are guided through the composite material 24 transversely with respect to the in-plane fibers 58. By using the abovedescribed flocking process in association with the mesh screen 48, the discontinuous carbon fibers 22 produce an accumulated mat 56 composed of erect carbon fibers 22 lying generally perpendicular to the composite material 24 with a percentage of in-plane or x-y plane fibers 58 having located therebetween a percentage of vertically aligned discontinuous fibers 22. The discontinuous fibers 22 typically have a restricted diameter such that the in-plane fibers 58 will yield and move aside upon insertion of the discontinuous fibers 22.

Figure 4:
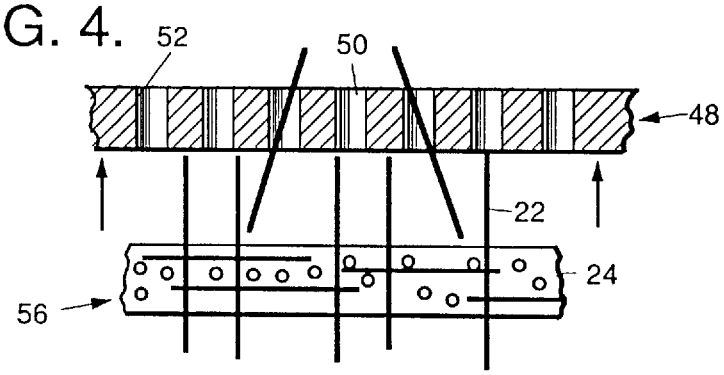
FIG. 4 shows the configuration of FIG. 2 in use to illustrate the alignment technique of the present invention.

Referring now to FIG. 4, after the insertion process has been completed, the mesh screen 48 is lifted vertically or perpendicularly away from the plies of fiber reinforced polymer matrix composite 24. Any poorly aligned discontinuous fibers 22 are simultaneously removed. By use of the mesh screen 48, the accumulated mat 56 now has a high percentage of aligned discontinuous fibers 22 oriented normal to and through the single ply of fiber reinforced polymer matrix composite 24 than what has been achieved by prior art alignment techniques. Although not shown, it may be envisioned that a glass capillary array such as those used in night vision apparatus may be used in place of the mesh screen 48 to achieve the same result.

By use of the above method and apparatus, a plurality of fiber reinforced polymer matrix composite mats or films 56 are produced wherein they are then stacked on top of each other, placed in an autoclave or press, pressurized and cured in accordance with the time/temperature requirements of the matrix resin 54.

Figure 5:
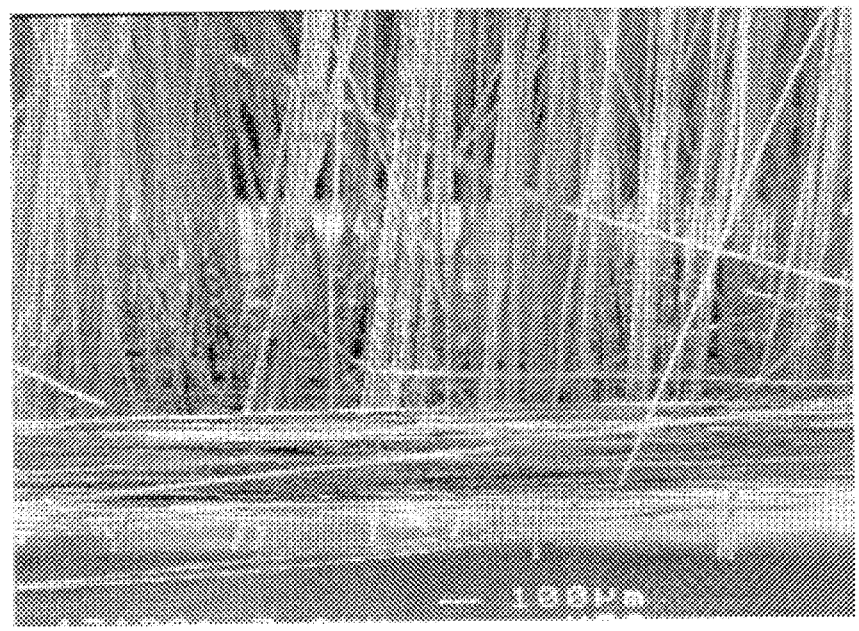
FIG. 5 is a scanned image of flocked carbon fibers embedded into a single ply of fiber reinforced polymer matrix composite in accordance with the method of the present invention.
Figure 6:
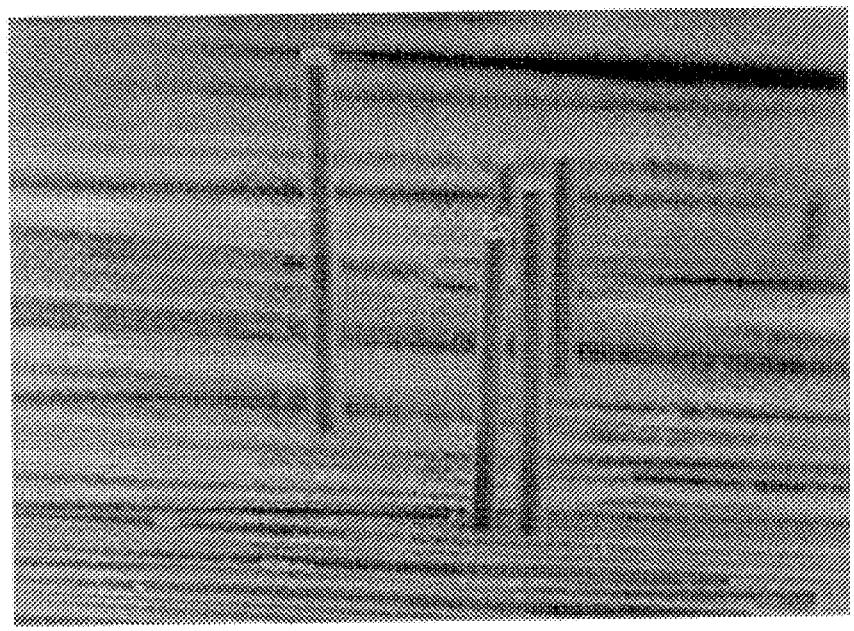
FIG. 6 is a scanned image of single filament Z-direction fiber reinforcement in the fracture zone of a fiber reinforced polymer matrix composite laminate.
Figure 7:
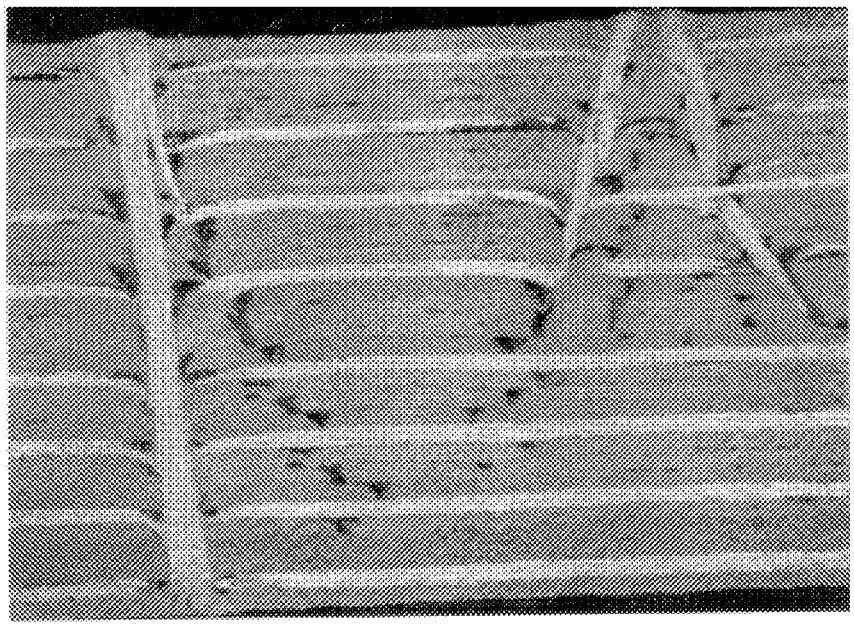
FIG. 7 is a scanned image of in-plane fiber damage resulting from prior art transverse fiber implantation processes.

As shown in the scanned image of FIGS. 5 and 6, the method and apparatus of the present invention provides for an improved fiber reinforced polymer matrix composite 24 having highly aligned Z-direction or transversely oriented fibers 22 with a fiber volume of up to 15 percent. Additionally, by use of the wire mesh 48, the discontinuous fibers 22 have relatively equivalent diameters as the in-plane fibers 58 thereby overcoming the problem associated with prior art techniques that used relatively large diameter fibers or fiber tows which resulted in breakage to the in-plane fibers 58, as shown in the scanned image of FIG. 7.

Figure 8:
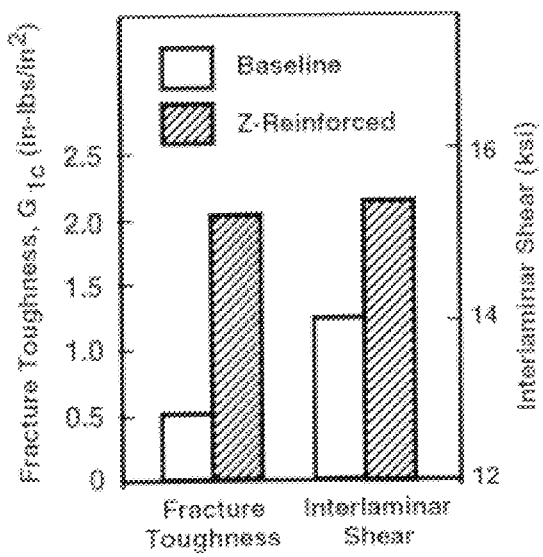
FIG. 8 is a graph illustrating the improvement in inter-laminar shear and fracture toughness by use of the method of the present invention.

Referring now to the measured test data shown in FIG. 8, the fracture toughness and interlaminar shear strength for the Z-reinforced polymer matrix composite 24 is greatly improved when compared to molding compounds that are manufactured without transverse reinforcement. Additionally, as shown by the measured test data in FIG. 9, the thermal conductivity of epoxy and several different types of fibers were compared and by using commercially available P120 or K1100 (pitch based carbon) conductive fibers in accordance with the method of the present invention a substantial improvement in thermal conductivity is achieved.

Referring now to the measured test data shown in FIG. 10, the prior art technique of using a molding compound made completely with a silicone matrix produces a high electrical resistance value in ohms which results in poor conductivity. Furthermore, the placement of carbon fibers or copper particulate material in the in-plane of the molding compound in association with the silicon matrix, while an improvement over use of a silicon matrix alone, still measured relatively high values of electrical resistance. However, by aligning the discontinuous fibers 22 in accordance with the method of the present invention, a dramatic improvement in the value of resistance was achieved, approximately nine orders of magnitude greater than using a silicone matrix alone.

There has been described and illustrated herein an improved method of manufacturing a reinforced polymer matrix composite material 24 by utilizing discontinuous fibers 22 which are embedded in the composite material 24 in the Z-direction that permits tailored electrical conductivity through the thickness of a prepreg composite while simultaneously improving thermal and mechanical strength. While particular embodiments of the invention have been described, it is not intended that the invention be limited exactly thereto, as it is intended that the invention be as broad in scope as the art will permit. The foregoing description and drawings will suggest other embodiments and variations within the scope of the claims, all of which are intended to be included in the spirit of the invention as herein set forth.

What is claimed is:

1. A method of transversely reinforcing a composite prepreg material comprising the steps of:

(a) positioning an in-plane fiber reinforced polymer matrix composite material composed of a resin matrix in an uncured state under a batch of discontinuous fibers;

(b) aligning said discontinuous fibers in a direction normal to said reinforced polymer matrix composite material's surface by inducing an electric field relative to said discontinuous fibers;

(c) releasing said discontinuous fibers through a grid associated over said reinforced polymer matrix composite material maintaining alignment and perpendicular insertion of said discontinuous fibers onto said reinforced polymer matrix composite material and attached thereto;

(d) maintaining alignment of said discontinuous fibers using a mesh screen or the like located parallel and substantially adjacent to said reinforced polymer matrix composite material; and, (e) inserting said embedded discontinuous fibers through said reinforced polymer matrix composite material in a plane substantially transverse to said reinforced polymer matrix composite material.

2. A method according to claim 1, wherein the steps a through e of said method of claim 1, are repeated to produce a plurality of plies stackable upon each other prior to curing, wherein said discontinuous fibers of each of said plies produce a composite molding compound whereby said plies have Z-reinforced fibers to provide enhanced material performance.

3. A method according to claim 1, wherein said composite prepreg is replaced with a stack of multiple prepreg plies.

4. A method according to claim 1, wherein said fibers comprise carbon fibers.

5. A method according to claim 1, wherein said mesh screen defines a plurality of alignment apertures having sidewalls sized to allow said discontinuous fibers to pass through, wherein lifting said mesh screen vertically away from said reinforced polymer matrix composite material, said discontinuous fibers which are not in full contact with said reinforced polymer matrix composite material and are not well aligned via the said mesh screen are simultaneously removed.

6. A method according to claim 1, wherein said mesh screen comprises a glass capillary array defining a plurality of alignment apertures having sidewalls sized to allow said discontinuous fibers to pass through, wherein lifting said glass capillary array vertically away from said reinforced polymer matrix composite material said discontinuous fibers which are not in full contact with said reinforced polymer matrix composite material and are not well aligned via the said glass capillary array are simultaneously removed.

7. A method according to claim 5, wherein said inserting said discontinuous fibers through said reinforced polymer matrix composite material is accomplished by applying pressure at a top of said discontinuous fibers, such that the in-plane fibers in the reinforced polymer matrix composite material will yield and move alongside the discontinuous fibers.

8. A method according to claim 1, wherein said fibers comprise conductive pitch based carbon fibers.

9. A method for manufacturing a composite laminate from an in-plane fiber reinforced polymer matrix composite composed of resin matrix in an uncured state and having fibers embedded therein comprising:

(a) a mesh means for orienting the fibers during an electrostatic flocking process, said mesh means positioned over the fiber reinforced polymer matrix composite material for receiving the fibers in a vertical position and preventing the fibers from lying in the fiber reinforced polymer matrix composite material without embedding one of the fiber ends therein;

(b) an insertion means for positioning the fibers through the fiber reinforced polymer matrix composite material in a vertical position and said mesh means preventing the conductive fibers from breaking during insertion thereof; and (c) said mesh means being removable vertically away from the fiber reinforced polymer matrix composite material leaving the fibers embedded within and through the fiber reinforced polymer matrix composite material; wherein said mesh means and said insertion means allows only the fibers vertically aligned to embed within and through the reinforced polymer matrix composite material, wherein said mesh means can be vertically removed from the fiber reinforced polymer matrix composite material to yield embedded fibers vertically inserted through the fiber reinforced polymer matrix composite material and generally perpendicular thereto.

10. A method according to claim 9, wherein the fibers are carbon fibers.

11. A method according to claim 9, wherein said insertion means comprises gently pressing upon the top of the fibers uniformly with a pressure sufficient to insert the fibers through the fiber reinforced polymer matrix composite material.

12. A method according to claim 9, wherein said mesh means defines a plurality of alignment apertures having sidewalls sized to allow the discontinuous fibers to pass through said alignment apertures and into the uncured resin matrix of the fiber reinforced polymer matrix composite.

13. A method according to claim 9, wherein said mesh means comprises a glass capillary array.

14. A method according to claim 9, wherein the ply of fiber reinforced polymer matrix composite material may be stacked with additional plies of fiber reinforced polymer matrix composite material one on top of another and cured in a relationship that produces a composite laminate which achieves desired mechanical, electrical and structural properties.

15. A method according to claim 9, wherein the fibers are conductive pitch based carbon fibers.

16. A method of transversely reinforcing a composite prepreg material comprising the steps of:

(a) positioning an in-plane fiber reinforced polymer matrix composite material composed of a resin matrix in an uncured state under a batch of discontinuous carbon fibers;

(b) aligning said carbon fibers in a direction normal to said reinforced polymer matrix composite material's surface by inducing an electric field relative to said carbon fibers, said electric field induced by a positive and a negative plate electrode, said positive and negative plate electrodes having a substantially parallel relationship between said reinforced polymer matrix composite material, said positive plate electrode defining a plurality of apertures sized to allow said carbon fibers to pass through;

(c) releasing said carbon fibers through a mesh screen associated over said reinforced polymer matrix composite material maintaining alignment and perpendicular insertion of said carbon fibers onto said reinforced polymer matrix composite material and attached thereto, said mesh screen located parallel and substantially adjacent to said reinforced polymer matrix composite material, said mesh screen defining a plurality of alignment apertures having sidewalls sized to allow said carbon fibers to pass through;

(d) inserting said attached carbon fibers through said reinforced polymer matrix composite material by applying a uniform pressure at a top of said carbon fibers thereby allowing said carbon fibers to be guided by said alignment apertures of said mesh screen in a plane substantially transverse to said reinforced polymer matrix composite material;

(e) lifting said mesh screen vertically away from said reinforced polymer matrix composite material, said carbon fibers which are not fully in contact with said reinforced polymer matrix composite material and are not well aligned via the said mesh screen being simultaneously removed; and (f) repeating steps a through e to produce a plurality of plies stackable upon each other prior to curing, wherein said discontinuous carbon fibers of each of said plies produce a composite laminate whereby said plies have Z-reinforced carbon fibers to provide enhanced material performance.

* * * * *